(12) United States Patent
Mahoney et al.

(10) Patent No.: US 8,105,074 B2
(45) Date of Patent: Jan. 31, 2012

(54) RELIABLE IGNITION OF HOT OXYGEN GENERATOR

(75) Inventors: William John Mahoney, East Aurora, NY (US); Bryan R. Bielec, Hamburg, NY (US); Gary Thomas Vardian, Indian Trail, NC (US); Adrian Christian Deneys, Danville, CA (US); Michael Francis Riley, Greenwood, IN (US); William Eric Slye, E. Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 273 days.

(21) Appl. No.: 12/490,652

(22) Filed: Jun. 24, 2009

(65) Prior Publication Data

US 2009/0325110 A1    Dec. 31, 2009

Related U.S. Application Data

(60) Provisional application No. 61/076,716, filed on Jun. 30, 2008.

(51) Int. Cl.
*F23D 11/44* (2006.01)
(52) U.S. Cl. ............... 431/11; 431/207; 431/233
(58) Field of Classification Search ........... 431/11, 431/207, 233
See application file for complete search history.

(56) References Cited

U.S. PATENT DOCUMENTS

| | | | |
|---|---|---|---|
| 2,439,609 A | 4/1948 | Mittendorf | |
| 2,604,510 A | 7/1952 | Berkey | |
| 2,806,518 A | 9/1957 | Poole et al. | |
| 2,872,496 A | 2/1959 | Chen | |
| 3,109,481 A | 11/1963 | Yahnke | |
| 3,224,486 A | 12/1965 | Geller et al. | |
| 3,399,950 A * | 9/1968 | Quirk | 431/153 |
| 4,240,392 A | 12/1980 | Matayoshi et al. | |
| 4,499,945 A | 2/1985 | Hill et al. | |
| 4,555,994 A | 12/1985 | Voigt et al. | |
| 5,149,261 A | 9/1992 | Suwa et al. | |
| 5,266,024 A | 11/1993 | Anderson | |
| 5,458,672 A * | 10/1995 | Ding | 75/643 |
| 5,560,890 A | 10/1996 | Berman et al. | |
| 5,803,726 A | 9/1998 | Bacon | |
| 5,845,480 A | 12/1998 | Defreitas et al. | |
| 5,944,507 A | 8/1999 | Feldermann | |
| 6,090,182 A | 7/2000 | Riley | |
| 6,233,974 B1 * | 5/2001 | Anderson et al. | 65/134.4 |

FOREIGN PATENT DOCUMENTS

| | | |
|---|---|---|
| DE | 102004037620 A1 | 2/2006 |
| GB | 654340 | 6/1951 |

* cited by examiner

*Primary Examiner* — Kenneth Rinehart
*Assistant Examiner* — William Corboy
(74) *Attorney, Agent, or Firm* — Donald T. Black

(57) ABSTRACT

A stream of hot oxygen is formed by providing a duct and a fuel lance movable axially within the duct, flowing gaseous fuel out of the lance into the duct, mixing it in the duct with gaseous oxidant, flowing the mixture out of the duct into an atmosphere which is hot enough that it ignites the mixture without aid of an ignition source other than said atmosphere, and combusting said mixture in a flame that does not extend into said duct; then moving the lance so its fuel outlet approaches the duct exit orifice so that the base of said flame moves inside said duct to the fuel outlet; and then moving the lance to draw the fuel outlet and the flame attached thereto away from the exit orifice into the duct; and increasing the flow rate of gaseous oxidant in said duct, so that combustion of fuel within the duct heats uncombusted oxygen which emerges as a stream of hot oxidant.

4 Claims, 3 Drawing Sheets

US 8,105,074 B2

RELIABLE IGNITION OF HOT OXYGEN GENERATOR

CROSS-RELATED TO RELATED APPLICATION

The present invention claims priority to U.S. provisional patent application Ser. No. 61/076,716, filed Jun. 30, 2008, the entire contents of which are incorporated herein by reference in its entirety.

FIELD OF THE INVENTION

This invention relates to forming a stream of hot oxygen, and particularly to how such a stream can be created.

BACKGROUND OF THE INVENTION

Many industrial processes employ oxygen, provided as a gaseous oxidant stream whose oxygen content may be from 22 vol. % to above 99 vol. % depending on the process. In many of these processes, benefit is realized if the gaseous oxidant stream is hotter than ambient, and often if the temperature of the stream exceeds 1000 F or even 2000 F, and if the gaseous oxidant stream has a substantial velocity.

The present invention provides a useful method of providing a stream of hot oxygen.

BRIEF SUMMARY OF THE INVENTION

One aspect of the present invention is a method of forming a stream of hot oxygen, comprising (A) providing a duct having an exit orifice and providing a hollow fuel lance positioned inside said duct and movable axially within said duct, said lance having a fuel outlet at the end of said lance that is closer to said exit orifice of said duct;

(B) flowing gaseous fuel within said fuel lance and out of said fuel outlet into said duct in the space in said duct between said fuel outlet and said exit orifice, and flowing gaseous oxidant in said duct toward said exit orifice into said space, thereby forming a mixture of said gaseous oxidant and said gaseous fuel in said space;

(C) flowing said mixture out of said duct through said exit orifice into an atmosphere which is hot enough that it ignites said mixture without aid of an ignition source other than said atmosphere, and combusting said mixture in a flame that does not extend into said duct;

(D) then moving said fuel lance so as to move said fuel outlet toward said exit orifice, so that said fuel outlet is preferably inside said duct exit orifice but may protrude out of said exit orifice, so that the base of said flame moves to said fuel outlet, and then (E) moving said fuel lance so as to move said fuel outlet away from said exit orifice inside said duct while maintaining said flame with its base at said fuel outlet, and (F) after the base of said flame has moved to said fuel outlet, increasing the flow rate of said gaseous oxidant in said duct toward said exit orifice, wherein at said increased flow rate the oxygen in said gaseous oxidant is in stoichiometric excess required for complete combustion relative to said gaseous fuel being flowed into said duct, and said excess oxygen is heated in said duct by said combustion and emerges from said exit orifice as a stream of hot oxidant.

Another aspect of the present invention is apparatus useful to form a stream of hot oxygen, comprising (A) a duct having an exit orifice;

(B) a source of gaseous oxidant capable of feeding said oxidant into said duct at a flow rate that can be controllably varied;

(C) a hollow fuel lance positioned inside said duct and movable axially within said duct, said lance having a fuel outlet at the end of said lance that is closer to said exit orifice of said duct, and apparatus capable of moving said fuel lance axially within said duct;

(D) a source of gaseous fuel capable of feeding said fuel into said lance at a rate that can be controllably varied;

wherein (i) said source of gaseous oxidant is capable of feeding said oxidant at a rate at which oxygen in said oxidant is in stoichiometric excess required for complete combustion relative to the fuel fed into said lance; (ii) said fuel lance can be moved to move said fuel outlet toward said exit orifice into a flame capture position at which a flame that is formed by combustion of said oxidant and said fuel and that is only outside said exit orifice can move into said duct with its base at said fuel outlet when fuel is flowing from said fuel outlet and oxidant is flowing in said duct; and (iii) said source of gaseous oxidant and said source of gaseous fuel are capable of providing said oxidant and fuel at flow rates at which a flame that is formed by combustion of said oxidant and said fuel and that is only outside said exit orifice does not extend into said duct unless said fuel outlet is in said flame capture position.

In a preferred aspect of the present invention, said apparatus further comprises structure which can provide a gaseous ambient atmosphere outside said exit orifice which atmosphere is hot enough that it can ignite said mixture without aid of an ignition source other than said atmosphere. A tuyere of an iron-making vessel is one such structure.

DETAILED DESCRIPTION OF THE INVENTION

Figure 1:
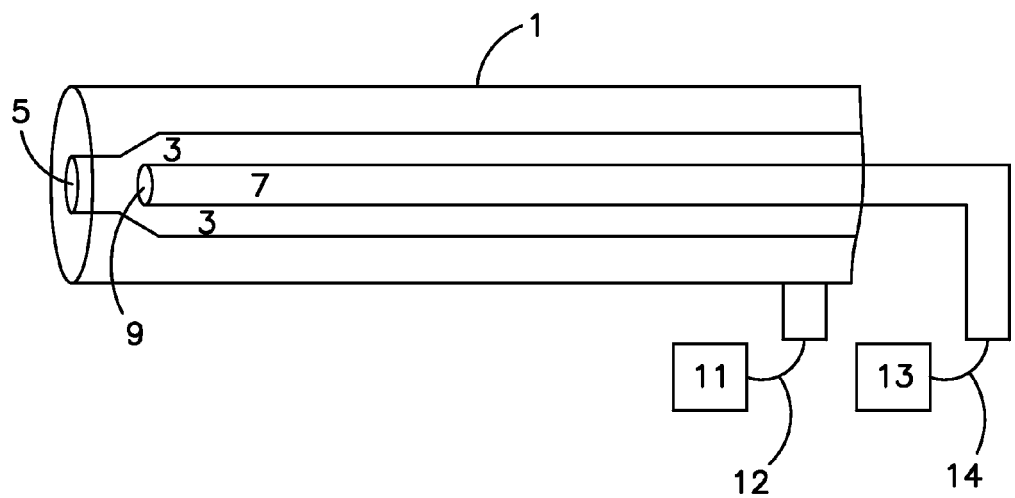
FIG. 1 is an overall cross-sectional view of apparatus useful in the present invention.

FIG. 1 is a schematic representation of apparatus embodying the present invention useful for producing a stream of hot oxygen. The apparatus 1 includes duct 3, in the form of a passageway, preferably of uniform diameter, which terminates at one end in exit orifice 5. The embodiment depicted, in which the diameter of exit orifice 5 is less than the diameter of duct 3, is useful, but the diameter of exit orifice 5 can be less than, greater than or the same as the diameter of duct 3. Hollow fuel lance 7 is positioned within duct 3, preferably coaxially with duct 3. Of the two ends of lance 7, the end which is closer to exit orifice 5 is fuel outlet 9. Fuel outlet 9 can be a single hole in the end of lance 7, or it can comprise a plurality of smaller openings passing through the end of lance 7. Lance 7 is supported within duct 3 in a manner which permits lance 7 to be moved axially within duct 3 so that fuel outlet 9 can move into a position close to exit orifice 5, and so that lance 7 can be moved in a way that fuel outlet 9 is repositioned within duct 3 farther away from exit orifice 5. Appropriate support bearings permitting such positioning and movement of lance 7, and particular apparatus which can move lance 7 as described herein, are not shown in FIG. 1 but are described in further detail below.

As typical dimensions of apparatus 1, for purposes of illustration and not limitation, the interior of duct 3 is typically 1-ft to 6-ft long and 0.5-in to 2.5-in. in diameter, and exit orifice typically 0.5-in to 2.0-in. in diameter, and lance 7 (the portion within duct 3) is typically 1.25-ft. to 6.5-ft. in length, and its hollow interior is typically 0.25-in. to 1.5-in. in diameter. Where a single fuel outlet is provided, its diameter is typically 0.125-in. to 1-in. in diameter, and if multiple fuel outlets are provided their diameter is typically 1/32-in. to 0.375-in.

Duct 3 is connected by suitable piping 12 to source 11 of gaseous oxidant which is to be fed into duct 3. Piping 12 feeds gaseous oxidant into duct 3. Source 11 also includes controls that permit the operator to controllably vary the flow rate of the gaseous oxidant into duct 3. The gaseous oxidant contains oxygen in an amount ranging from 20.9 vol. percent (i.e., when the gaseous oxidant is air) to greater than 99 vol. percent oxygen. Preferably, the gaseous oxidant contains at least about 50 vol. percent oxygen, and more preferably at least about 90 vol. percent oxygen.

Hollow lance 7 is connected by suitable piping 14 to a source 13 of the gaseous fuel. Piping 14 feeds fuel into the hollow interior of lance 7. Source 13 also includes controls so that the operator can controllably vary the flow rate of the gaseous fuel into lance 7. The gaseous fuel can in general comprise any gaseous combustible material. Preferably, the gaseous fuel is combustible hydrocarbons. Examples of preferred and gaseous and vaporous fuels include natural gas, methane, propane, petroleum gas, stove gas, producer gas, coke oven gas, and alkanes, alkenes, and alkynes which are gaseous at 100° C. or lower. Other fuels may include vaporized alcohols (e.g., ethanol), and vaporized or pyrolysed fuel oils (e.g., No. 2, diesel, gasoline or biofuel).

The end of lance 7 that is further from exit orifice 5 passes through the end of duct 3 that is opposite to exit orifice 5, through appropriate seals familiar to those of ordinary skill in this art, which are not depicted FIG. 1.

Duct 3 and lance 7 should be constructed of materials that can withstand the high temperatures to which they are exposed in operation. Suitable materials include carbon steels, stainless steels and high-temperature alloys. The duct 3 can be cooled by flowing cooling water through an external water jacket (not shown). However, one advantage of this invention is that adequate cooling that prevents the components of the apparatus (especially the duct, the exit orifice, the lance, and the fuel outlet (tip) of the lance) from being damaged by excessive heating, can be provided by maintaining the flow rates of the gaseous oxidant and fuel through duct 3 high enough. This is unexpected as one would have expected to have to turn down the flow rates in order to light the flame at the end of the lance, and to have to endure the resultant risk of overheating. With the present invention, ignition can be accomplished with sufficient gas flow rates so that externally applied cooling (by which is meant withdrawal of heat from the interior of duct 3 partially or completely through a wall of duct 3, such as by use of a water jacket) is not necessary.

Figure 2:
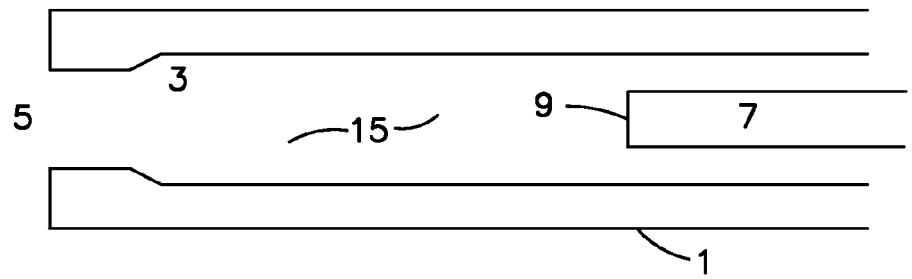
FIG. 2 is a cross-sectional view of a portion of apparatus useful to form a hot oxygen stream in accordance with the present invention.
Figure 3:
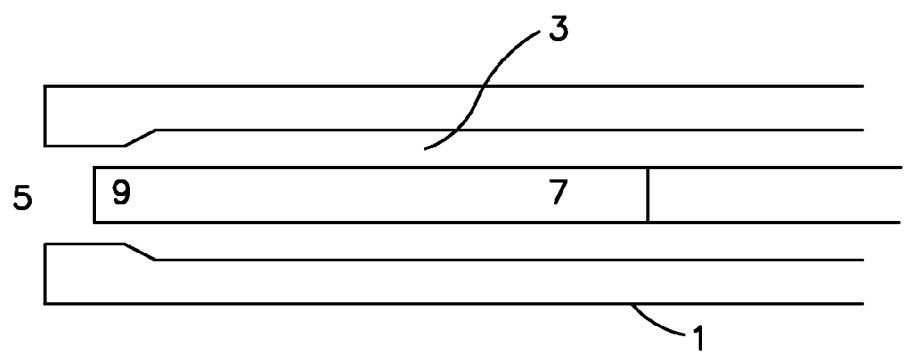
FIG. 3 is a cross-sectional view of the apparatus of FIG. 2, seen at a different point in the method of the present invention.
Figure 4:
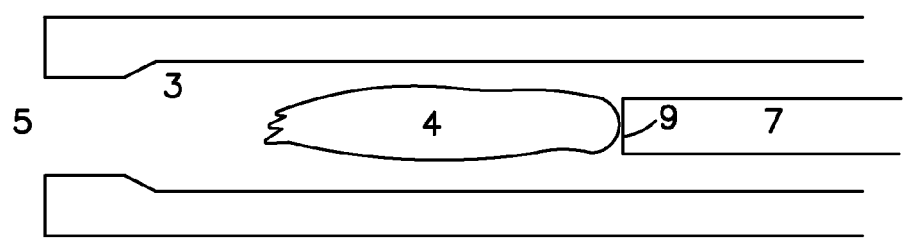
FIG. 4 is a cross-sectional view of the apparatus of FIG. 2, seen at a different point in the method of the present invention.

FIGS. 2, 3 and 4 are views of the interior of an end portion of apparatus 1, in various stages of the method of the present invention. Reference numerals that also appear in FIG. 1 have the same meanings in FIGS. 2, 3 and 4. Referring first to FIG. 2, lance 7 is positioned so that fuel outlet 9 defines space 15 between fuel outlet 9 and exit orifice 5. Fuel outlet 9 must be far enough away from exit orifice 5 that when a flame is established outside apparatus 1 at exit orifice 5, as described below, the flame remains entirely outside duct 3.

At the stage of the present invention depicted in FIG. 2, gaseous fuel is flowed through lance 7 out fuel outlet 9 into space 15, and gaseous oxidant is flowed into duct 3 so that it flows into space 15 as well. The gaseous oxidant and the gaseous fuel mix in space 15, and the mixture of fuel and oxidant flows out of exit orifice 5. The oxygen in the gaseous oxidant being provided at this stage of the method may be stoichiometrically less than, equal to, or in excess over the amount of gaseous fuel being fed for complete combustion of the fuel.

In the practice of the method of this invention, the apparatus 1 described herein is located such that the ambient atmosphere immediately outside exit orifice 5 is at a temperature high enough that the mixture of gaseous fuel and gaseous oxidant emerging from exit orifice 5 is ignited by the heat of this ambient atmosphere. The temperature sufficient to ignite the mixture can readily be determined in any particular application but is generally at least 1000 F. This ignition occurs without the aid of an ignition source other than the ambient atmosphere and its high temperature. That is, the mixture of gaseous fuel and gaseous oxidant is ignited even without the aid of a conventional igniter or ignition source such as an open flame, a spark generator, a high resistance wire, and the like. Examples of situations providing this high temperature ambient atmosphere are described below.

Ignition of the mixture of gaseous fuel and gaseous oxidant by the hot ambient atmosphere outside exit orifice 5 causes the fuel and the oxidant to combust in a flame whose base does not extend into duct 3. The base of the flame may be at exit orifice 5 or separated from exit orifice 5. At this stage of operation, the gaseous fuel and the gaseous oxidant are fed out through exit orifice 5 at a high enough velocity that the flame in which they combust does not propagate upstream into duct 3. The flow rate of the gaseous oxidant through duct 3 (and preferably also the flow rate of the fuel) at this stage of the operation should be less than the design flow rate (so that the flow rate can be increased later).

While the velocities that are effective to keep such propagation from occurring can readily be determined for any given apparatus, a typical flow rate, for example, of the gaseous oxidant through the duct 3 at this stage of the operation is 500 to 2000 scfh, and is less than the design flow rate of 7500 scfh from source 11, and a typical flow rate of the gaseous fuel into duct 3 at this stage of the operation is 300 to 600 scfh, which is 50-100% of the design flow for producing 7500 scfh hot oxygen at 3000 F. Stoichiometrically, the ratio of oxygen in the gaseous oxidant to the fuel at this stage should be in the range of 0.75 to 7. These typical values are dependent on oxidant concentration, fuel type, design supply pressure and operating scale.

In the next stage of the operation of the method of the present invention, after the flame is established outside exit orifice 5, lance 7 is moved so that fuel outlet 9 moves closer to exit orifice 5. During this moving, the flow of gaseous oxidant and the flow of fuel continue, thus continuing to support the combustion at the flame outside exit orifice 5. As fuel outlet 9 approaches exit orifice 5, a point is reached at which the base of the flame that had been outside exit orifice 5 moves into duct 3, through exit orifice 5, so that the base of the flame is at or slightly inside fuel outlet 9. FIG. 3 shows a typical position of lance 7 in duct 3 when the base of the flame would move to be at fuel outlet 9. The fuel tube can protrude outside of exit orifice 5, but this is not preferred because it exposes the tip to the hot atmosphere (and possible overheating) and potential plugging from splattering of molten iron and slag which can be present.

Then, lance 7 is moved axially so that fuel outlet 9 moves away from exit orifice 5 into the interior of duct 3. The flows of gaseous fuel and gaseous oxidant are maintained so that the flame continues with its base at fuel outlet 9 so that the flame, and preferably all of the flame, is drawn into duct 3. FIG. 4 shows a typical position of lance 7 in duct 3 after lance 7 has been drawn away from exit orifice 5 into duct 3. Flame 4 has its base at fuel outlet 9. The base of flame 4 can be slightly within fuel outlet 9, or at the outer face of outlet 9 without extending into outlet 9.

The flow rate of the gaseous oxidant into duct 3 is increased. The increase can begin while the lance 7 is being moved to draw fuel outlet 9 away from exit orifice 5, or the increase can begin after the movement of fuel outlet 9 away from exit orifice 5 has ended. The flow rate of the gaseous oxidant should be increased so that a stoichiometric excess of oxygen relative to the gaseous fuel being fed into duct 3 is being provided. The flow rate of the gaseous fuel can be increased as well. The stoichiometric ratio of oxygen in the oxidant, at the increased flow rate, to the fuel, is greater than 2:1 and is preferably at least 25:1 and more preferably at least 12.5:1. Typically the flow rate of the gaseous oxidant is increased to a flow rate of 5000 to 10,000 scfh although flow rates of 1000 to 100,000 scfh or more can be used depending on the size of the operation. The fuel feed rate is typically on the order of 3 to 12% of the oxygen flow rate, on a stoichiometric basis, when the fuel is natural gas. With other fuels the corresponding figures would be adjusted on the basis of the heating value relative to natural gas; for instance, the heating value of propane is 2.5 times that of natural gas, so the amount of propane required for the same flow rate of oxygen would be $1/(2.5)=0.4$ times the flow rate of natural gas. The combustion of the gaseous oxidant and the gaseous fuel in duct 3 heats the excess uncombusted oxygen to a temperature of at least 1000° F., and preferably a temperature of at least 2000° F. and more preferably to at least 3000° F. A stream of hot oxygen, also containing products of combustion of the gaseous fuel and oxidant, emerges from exit orifice 5 at a velocity of typically at least 1000 feet per second, and even at least 2000 feet per second. Depending of course on the amount of excess oxygen relative to the amount of gaseous fuel, the oxygen content of the hot oxygen stream that emerges from exit orifice 5 is typically about 80 vol. %, and preferably at least 65 vol. %. The hotter the oxygen, the lower the oxygen content that remains in the hot oxygen stream. Once the flame has been established within duct 3 and the stream of hot oxygen is being generated in duct 3 and emerges from exit orifice 5, operation of the flame and generation of the hot oxygen stream can continue as long as desired. During this operation, the conditions can remain unchanged, or the operator may if desired vary the velocity of the hot oxygen stream and/or the oxygen content of the hot oxygen stream, by varying the oxidant and fuel flow rates and/or the oxygen content of the oxidant that is fed into duct 3.

As an example, to produce a hot oxygen stream having a temperature of 3000 F using 7500 scfh of oxidant (as 99 vol. % $O_2$) and 600 scfh of natural gas, the natural gas rate is $(100 \times 600)/7500 = 8\%$ of the oxidant rate. Assuming that the natural gas is 100% $CH_4$, then 600 scfh of the natural gas will react with 1200 scfh of $O_2$ so the amount of uncombusted oxidant is $(100 \times (7500-1200)/7500) = 84\%$ of the initial flow. This example is based on the oxidant duct having a 1-inch inside diameter, the exit orifice having a 0.65-inch diameter, the fuel lance having a 0.5-inch inside diameter, and the fuel outlet being comprised of five holes in the end of the lance, each 1/16th (one-sixteenth) of an inch in diameter.

Figure 6:
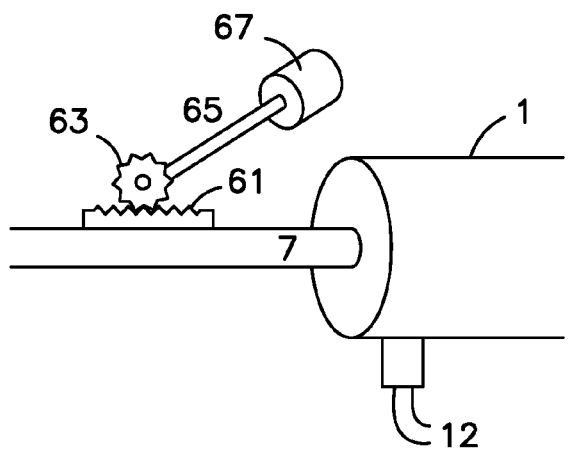
FIG. 6 is a perspective view of an embodiment useful in the practice of the present invention.

The aforementioned movement of lance 7 within duct 3 can be achieved by hand, such as by manipulating a portion of lance 7 that protrudes from the end of the apparatus opposite to the end where exit orifice 5 is located. However, movement of lance 7 can be achieved with mechanical or pneumatic controls, which are preferred. For example, referring to FIG. 6, a toothed track 61 can be attached to a portion of lance 7 that protrudes from apparatus 1, and a gear wheel 63 can be provided which has teeth around its circumference that engage track 61. The gear wheel 63 is able to turn on an axle 65 which can be rotated by a motor 67. Conventional controls enable the operator to start and stop rotation of axle 65 (and thus of wheel 63), to leave the lance 7 in one position, or to actuate the motor and control the direction of rotation of the axle 65 and wheel 63, the speed at which axle 65 rotates (thus controlling the speed at which lance 7 moves in duct 3), and the position of lance 7 when rotation of axle 65 stops.

Figure 7:
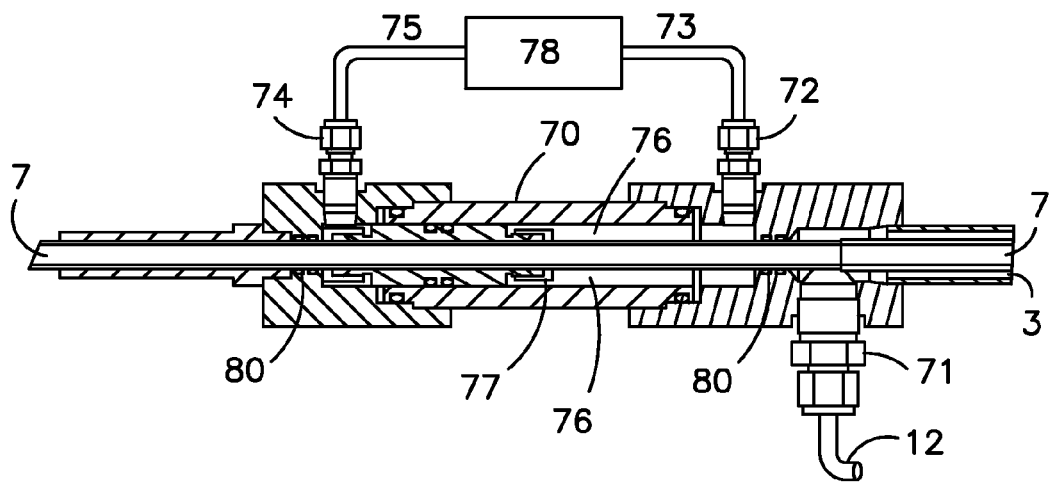
FIG. 7 is a cross-sectional view of another embodiment of the apparatus of the present invention.

Another preferred way to controllably move lance 7 uses liquid or gaseous fluid such as compressed air or nitrogen or oxygen which is applied against one side or the other of a platen that is attached to lance 7. Referring to FIG. 7, lance 7 extends into an end of duct 3 which is fixedly attached to housing 70. Lance 7 is slidable through housing 70 past seals such as O-rings 80 which provide a gastight seal preventing gas from passing past the seals into cavity 76 within housing 70. Oxidant piping 12, described above, is connected to oxidant connector 71 through which oxidant can pass into duct 3. Housing 70 also comprises air connector 72, which is connected to air line 73, and air connector 74, which is connected to air line 75. Pressure plate 77 is attached to a portion of lance 7 that lies in cavity 76. Pressure plate 77 is dimensioned to provide a slidable but gastight fit of the outermost edges of plate 77 with the inner surfaces of cavity 76. The interior of housing 70 is constructed so that air fed through line 73 can pass through connector 72 into cavity 76 on one side of plate 77, and air or nitrogen or oxygen fed through line 75 can pass through connector 74 into cavity 76 on the other side of plate 77. When movement of lance 7 is desired, controller 78 increases the pressure in one of line 73 or 75, depending on the desired direction of movement of lance 7. Pressure is applied until lance 7 has moved the desired distance, and then the pressure is equalized in lines 73 and 75. The speed of movement of lance 7 is provided by the size of the difference in pressure applied between lines 73 and 75. While this embodiment is described with air as the medium within lines 73 and 75 and within cavity 76 that applies pressure to move lance 7, this embodiment can be employed with any other gaseous or liquid fluid instead of air, such as nitrogen or other inert gas.

The hot oxygen stream generated in accordance with the present invention can be used in any industrial application in which such a stream is desired, provided that the application provides the aforementioned high-temperature ambient atmosphere outside exit orifice 5 to ignite the mixture of fuel and oxidant that emerges from exit orifice 5. For instance, the hot oxygen stream can be fed into a hot flue gas from a combustion chamber, to react with components of the flue gas; examples of such combustion chambers include incinerators, and utility boilers that burn gaseous, liquid and/or solid fuel. Also, the hot oxygen stream can be fed into a hot flue gas or product gas stream that is formed by a processing stage in (for example) a manufacturing process, chemical plant, or petrochemical refinery.

Figure 5:
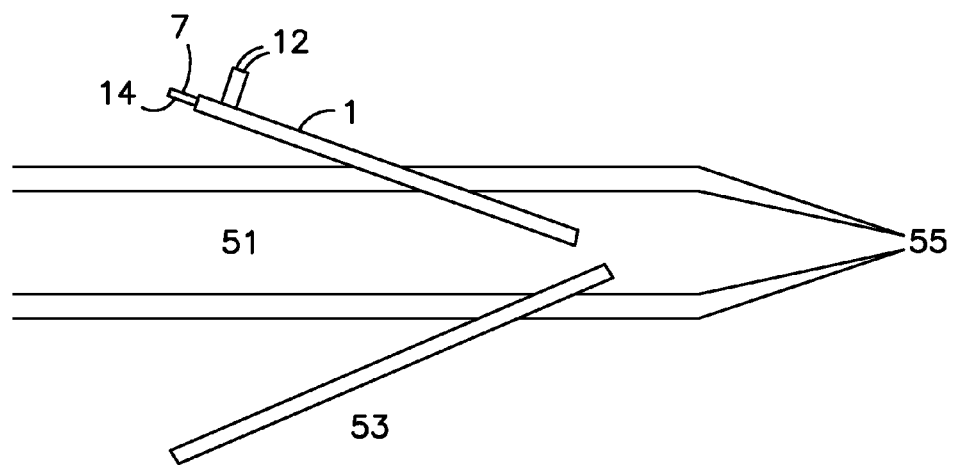
FIG. 5 is a cross-sectional representation of one embodiment of the application of the present invention in an industrial setting.

A preferred example of an industrial application for the hot oxygen stream generated in accordance with this invention is in production of metal such as iron, steel, and copper. FIG. 5 illustrates one such application, for iron-making and hot metal manufacturing, in which apparatus 1 described above feeds a hot oxygen stream into blowpipe 51 where the hot oxygen mixes with pulverized coal fed through coal lance 53 and with hot blast air fed through blowpipe 51. When an unignited mixture of gaseous oxidant and fuel emerges from apparatus 1 into the hot blast air, the blast air is hot enough, typically 1500 to 2400 F, to ignite the mixture, following which the fuel lance of apparatus 1 is moved into duct 3 as described above and the flame that is formed by combustion of the gaseous fuel and oxygen within apparatus 1 generates a stream of hot oxygen that emerges from apparatus 1. That stream of hot oxygen and the coal combust in blowpipe 51, and the resulting mixture including hot combustion products emerges through tuyere 55 into a blast furnace (not shown).

The present invention provides numerous advantages. For instance, igniting the flame outside the apparatus 1 instead of relying on ignition by propagation (flashback) of the flame into duct 3 avoids operational control difficulties that come from keeping the flow rates of oxidant and fuel so low that flashback can occur.

Also, relying on flashback into the duct as part of the ignition process would require turning down the oxidant and fuel flow rates far enough to allow flashback, complex and expensive flow control equipment including bypass equipment around the main flow controls would be required in order to allow adequate control of both flows at those low flow rates. The present invention avoids the need for separate bypass flow control equipment.

Another advantage of the present invention is that avoiding flashback avoids the thermal stresses that would be imposed on the apparatus interior. Instead, the flows of gaseous oxidant and fuel through duct 3 before they are ignited outside the apparatus provide cooling to the apparatus, so there is no need for additional cooling structure such as a water jacket.

What is claimed is:

1. A method of igniting and forming a stream of hot oxygen, comprising:
    (A) providing a duct having an exit orifice, and providing immediately outside said exit orifice an atmosphere which is hot enough that it ignites the mixture of gaseous oxidant and gaseous fuel that is formed in step (B) without aid of an ignition source other than said atmosphere, and providing a hollow fuel lance positioned inside said duct and movable axially within said duct, said lance having a fuel outlet at the end of said lance that is closer to said exit orifice of said duct;
    (B) flowing gaseous fuel within said fuel lance and out of said fuel outlet into said duct in the space in said duct between said fuel outlet and said exit orifice, and flowing gaseous oxidant in said duct toward said exit orifice into said space, thereby forming a mixture of said gaseous oxidant and said gaseous fuel in said space, and providing immediately outside said exit orifice an atmosphere which is hot enough that it can ignite said mixture of gaseous oxidant and gaseous fuel without aid of an ignition source other than said atmosphere;
    (C) flowing said mixture out of said duct through said exit orifice into said atmosphere which is hot enough that it ignites said mixture without aid of an ignition source other than said atmosphere, and combusting said mixture in a flame that does not extend into said duct;
    (D) then moving said fuel lance so as to move said fuel outlet toward said exit orifice, so that said fuel outlet is inside said duct exit orifice or protrudes out of said exit orifice, so that the base of said flame moves to said fuel outlet, and then
    (E) moving said fuel lance so as to move said fuel outlet away from said exit orifice inside said duct while maintaining said flame with its base at said fuel outlet inside said duct, and
    (F) after the base of said flame has moved to said fuel outlet, increasing the flow rate of said gaseous oxidant in said duct toward said exit orifice, wherein at said increased flow rate the oxygen in said gaseous oxidant is in stoichiometric excess required for complete combustion relative to said gaseous fuel being flowed into said duct, and said excess oxygen is heated in said duct by said combustion and emerges from said exit orifice as a stream of hot oxidant.

2. A method according to claim 1 wherein said fuel outlet does not protrude out of said duct exit orifice.

3. A method according to claim 1 wherein said duct and said lance are cooled sufficiently by the flows of said gaseous oxidant and of said gaseous fuel that externally applied cooling of the duct is not provided.

4. A method according to claim 1 wherein said movement of said lance in said duct is effectuated by application of liquid or gaseous fluid pressure to a plate attached to said lance which is not in contact with said gaseous oxidant or said fuel.

* * * * *